(12) United States Patent
Hindus et al.

(10) Patent No.: US 6,754,546 B1
(45) Date of Patent: Jun. 22, 2004

(54) ELECTRONIC AUDIO CONNECTION SYSTEM AND METHODS FOR PROVIDING SAME

(75) Inventors: Debby Hindus, San Francisco, CA (US); G. Roberto Aiello, Palo Alto, CA (US); Krisnawan Rahardja, San Jose, CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/169,638

(22) Filed: Oct. 9, 1998

Related U.S. Application Data (60) Provisional application No. 60/103,814, filed on Oct. 8, 1998, and provisional application No. 60/062,144, filed on Oct. 9, 1997.

(51) Int. Cl.⁷ .............................................. G06F 17/00
(52) U.S. Cl. ..................................... 700/94; 348/14.01
(58) Field of Search ............................... 381/2, 91, 123; 700/94; 348/14.08, 14.05, 14.09, 14.01

(56) References Cited

U.S. PATENT DOCUMENTS

| | | |
|---|---|---|
| 4,172,969 A | 10/1979 | Levine et al. |
| 4,536,887 A | 8/1985 | Kaneda et al. |
| 4,780,883 A | 10/1988 | O'Connor et al. |
| 4,866,765 A | 9/1989 | Yang |
| 4,882,726 A | 11/1989 | Lang et al. |
| 4,887,204 A | 12/1989 | Johnson et al. |
| 4,893,305 A | 1/1990 | Fernandez et al. |
| 4,940,963 A | 7/1990 | Gutman et al. |
| 5,231,649 A | 7/1993 | Duncanson |
| 5,267,323 A | 11/1993 | Kimura |
| 5,335,011 A | 8/1994 | Addeo et al. |
| 5,360,446 A | 11/1994 | Kennedy |
| 5,459,458 A | 10/1995 | Richardson et al. |
| 5,481,610 A | 1/1996 | Doiron et al. |
| 5,487,181 A | 1/1996 | Dailey et al. |
| 5,590,396 A | 12/1996 | Henry |
| 5,664,015 A | 9/1997 | Ford et al. |
| 5,666,215 A | 9/1997 | Fredlund et al. |
| 5,694,474 A | 12/1997 | Ngo et al. |
| 5,765,151 A | 6/1998 | Senator |
| 5,790,138 A | 8/1998 | Hsu |
| 5,826,253 A | 10/1998 | Bredenberg |
| 6,320,958 B1 * | 11/2001 | Sekine ................... 379/406.01 |

FOREIGN PATENT DOCUMENTS

EP  0 730 365 A2  9/1996  ............ H04M/3/56

OTHER PUBLICATIONS

Covell, et al: "Mach1: Nonuniform Time–Scale Modification of Speech" Proceedings of the IEEE Int'l Conf. On Acoustics, Speech and Signal Processing, May 12–15, 1998, Seattle WA.

(List continued on next page.)

*Primary Examiner*—Minsun Oh Harvey
(74) *Attorney, Agent, or Firm*—Van Pelt & Yi LLP (57) ABSTRACT

The electronic audio connection system of the present invention provides an experience much like sharing a room with several involved parties, even though the parties are physically separated. Speech enhancement and speech emphasis processing functions ensure parties perceive the speech captured in the audio signals, typically the most important portion of the captured audio signals. To capture audio signals, each space is provided a plurality of microphones arranged in that space so that the sum audio signal captured by the microphones enables the creation of a sharable audio space. Each separate physical space transmits its captured audio signals to a central server via a bi-directional data communications medium. The central server processes the summed audio signals and in turn transmits playable audio signals to each separate physical space. Speakers located in each separate physical space aurally transmit the playable audio signals. This creates an audio space shared by each of the active separate physical spaces.

18 Claims, 8 Drawing Sheets

OTHER PUBLICATIONS

Ngo, et al, "Adaptive Blind Separation of Audio Sources by A Physically Compact Device Using Second-Order Statistics", Interval Research Corp., Palo Alto, CA 94304–1216.

Scheirer, et al, "Construction and Evaluation of a Robust Multifeature Speech/Music Discriminator", Interval Research Corp., Palo Alto, CA. 94304, © IEEE 1997.

Slaney, et al, "Baby Ears: A Recognition System for Affective Vocalizations" Proceeding of the 1998 International Conference on Acoustics, Speech, and Signal Processing (ICASSP), Seattle WA, May 12–15, 1998.

BinaryLabs, Inc., http://www.peoplepost.com.

PhoneMate, Answering Machine & Cordless Telephone Easy To Use Owner's Guide, Dec., 1993.

* cited by examiner

ELECTRONIC AUDIO CONNECTION SYSTEM AND METHODS FOR PROVIDING SAME

CROSS REFERENCE TO RELATED APPLICATIONS

This Application is related to and claims priority of U.S. Provisional Patent Application No. 60/062,144 filed Oct. 9, 1997, incorporated herein by reference. This Application is also related to and claims priority of U.S. Provisional Patent Application No. 60/103,814 entitled METHODS AND APPARATUS FOR REMOTE SOCIAL INTERACTIONS filed Oct. 8, 1998, incorporated herein by reference. This Application is also related to U.S. patent application Ser. Nos. (a) 08/610,638 filed Mar. 4, 1996, (b) entitled METHOD AND APPARATUS FOR SENDING AND RECEIVING LIGHTWEIGHT MESSAGES filed Oct. 9, 1998, (c) entitled METHOD AND APPARATUS FOR SENDING PRESENCE MESSAGES filed Oct. 9, 1998, and (d) entitled VARIABLE BANDWIDTH COMMUNICATION SYSTEMS AND METHODS filed Oct. 9, 1998, all four being incorporated herein by reference.

BACKGROUND OF THE INVENTION

1. Field of the Invention

This invention relates generally to personal communication systems, and more particularly to electronic audio connection systems that enable two or more geographically separated physical spaces to interact socially within a shared audio space.

2. Description of the Related Art

Social reasons are the primary motivation for both intra-household (room to room) and inter-household (house to house) aural communication. For purposes of inter-household communication, households are primarily linked to one another by telephones and by telephone-extension devices such as answering machines. Related technologies include speaker-telephones. For purposes of intra-household communication, baby monitors enable parents to eavesdrop on their resting children from another room and intercoms enable people to talk room-to-room.

Ongoing contact with significant others is a fundamental human need not fully met by current household technologies. First, there is no technological support for a household to have continuous background awareness of distant households that it cares about, in the way that it has some ongoing awareness of physically neighboring households (e.g., by noticing a car is in the driveway, a lighted window, or muffled sounds of a conversation). Such awareness would allow conversations to take place opportunistically that currently do not take place, and might allow certain currently unwanted conversations to be avoided if such background awareness was sufficient for feeling "in touch."

The telephone (currently the primary technological support for remote conversations) embodies a model for initiating and disengaging from social interaction that is rarely found in everyday life. Disregarding for the moment non-basic elements such as busy signals, answering machines, caller-ID, etc., the telephone provides three states: disconnected, ringing, and connected. The model of social interaction created is akin to that created by a windowless room with a closed, locked, and soundproof door. Callers are forced to initiate interaction by knocking (ringing), without any advance indication of the callee's situation within.

Similarly, the callee is forced to decide whether to unlock and open the door with very limited information (even more limited in the telephone case, as at least a knock can have a distinctive rhythm). Once unlocked and thrown open, the conversational partners confront each other at close range, with little ability to adjust social distance to a mutually desired level. Conversations end, with little subtlety or room for re-engagement, by shutting the door and returning to an entirely disengaged state. People have adapted to this model remarkably well, but a technology that offers a more flexible mutually negotiated approach would be highly desirable.

There are, of course, a number of conversational devices currently available for remote social interactions including telephones, videophones, online "chat" and audio/video-conferencing systems, and caller-ID devices. However, the production of high-tech communication devices for the home is an emerging field. For example, there has been some research moving away from PC-based applications towards small dedicated appliances designed to fit functionally and aesthetically into the home that can provide some form of remote social interaction.

The term "media space" refers to the linking of a number of physically separated spaces to create a larger "virtual space" for communication between various individuals. Researchers have noticed that it is very difficult to document an objective gain from use of media spaces in workplaces, but also that the users nevertheless were unanimous about the usefulness of these systems A stated advantage is the social awareness that is provided and which may be conducive to deciding when direct communication would be appropriate. The awareness issue is sometimes refereed to as the support for background communication, see for instance William Buxton's GI (Graphical Interface) '95-paper about foreground and background.

SUMMARY OF THE INVENTION

The present invention comprises a number of solutions for the aforementioned problems, which characteristically take the form of easy-to-use household communication appliances. These "appliances" are fairly termed electronic audio connection systems, for they enable geographically separate physical spaces to share a single audio space. The appliances of the present invention are meant to complement existing household technologies (e.g. personal computers or PCs), rather than to replace them. They are primarily conceived of as being stand-alone appliances to best fit their form to their function, and to appeal to consumers who do not have or want PCs, but at least some could be sold in an alternative version as a software application.

More particularly, the present invention comprises a set of easy-to-use consumer devices for lightweight social awareness and/or conversation between households of friends or family members or similar applications. The family of devices/capabilities (and related services) that the present invention contemplates focus on both home-to-home and room-to-room social communication range. This aural communication may be supplemented through simple feedback devices, buttons and timing circuitry that aid in the negotiation surrounding the sharing of an audio space. Lightweight, ephemeral connections and communication characterize them with friends and family. The devices of the present invention are less intrusive and simpler than a telephone, hands-free and high quality, yet more intimate and immediate than email.

Appropriately configured, an electronic audio connection system of the present invention conveys the experience of sharing a room with several involved parties. Speech enhancement and speech emphasis processing functions ensure parties perceive the speech captured in the audio signals, typically the most important portion of the captured audio signals. To capture audio signals, each space is provided a plurality of microphones arranged in that space so that the sum audio signal captured by the microphones enables the creation of a sharable audio space. Each separate physical space transmits its captured audio signals to a central server via a bi-directional data communications medium. The central server processes the summed audio signals and in turn transmits playable audio signals to each separate physical space. Speakers located in each separate physical space aurally transmit the playable audio signals. This creates an audio space shared by each of the active separate physical spaces.

These and other advantages of the present invention will become apparent upon reading the following detailed descriptions and studying the various figures of the drawings.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

The electronic audio connection systems of the present invention are intended to be high quality, hands-free audio systems that enable geographically separate physical spaces to share a single audio space. The sharing of the audio space is typically prefaced by a negotiation between parties in the different spaces, ensuring voluntary and proactive involvement in the sharing. Several different audio connection systems of the present invention are described below with reference to FIGS. 1–5.

Figure 1:
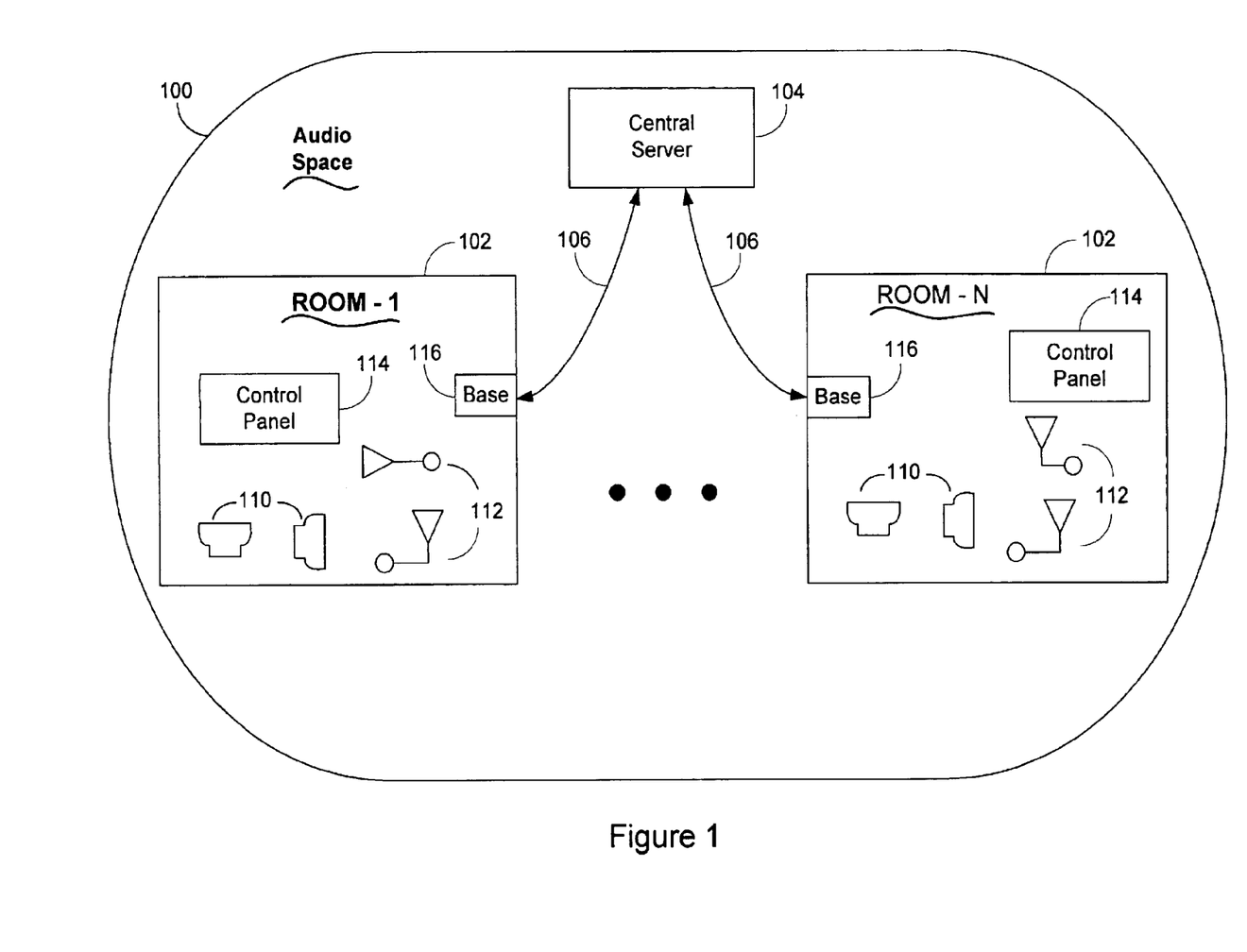
FIG. 1 diagrams an electronic audio connection system having a central server in accordance with one embodiment of the present invention.

FIG. 1 diagrams an electronic audio connection system 100 in accordance with one embodiment of the present invention. The electronic audio connection system 100 includes a plurality of room-like, geographically separate physical spaces 102 each bi-directionally coupled to a central server 104 through a communications medium 106. The particular physical space ROOM-1 includes a plurality of speakers 110, a plurality of microphones 112, a control panel 114, and an audio system base 116. It is contemplated that these devices may be provided to the user in a compact, easily installable package.

The plurality of microphones 112 are arranged around the space ROOM-1 in a manner suitable for capturing the audio space formed within ROOM-1. Similarly, the plurality of speakers 110 are arranged around ROOM-1 in a manner suitable for creating and controlling the audio space of ROOM-1 in a desired manner. Note that any constraint on possible speaker and microphone arrangements is due to digital signal processing (DSP) limitations. Thus, in theory, the devices could be placed in any arrangement as long as the necessary DSP functions are available to achieve the desired results. In preferred embodiments, the speakers 110 and the microphones 112 are unobtrusively positioned to become like part of the room. Locating the devices on the ceiling and hiding them in furniture, appliances, and the like are proposed.

Basic operation of the electronic audio connection system 100 is as follows. First there is a period of negotiation between the active physical spaces to determine issues such as which physical spaces 102 will be mixed into the shared audio space, how such shared audio space is formed, and what is the nature of the shared audio space. Possible negotiation processes are described below in more detail below with reference to FIGS. 6–8. Following the negotiation period, audio signals captured by the microphones 112 are transmitted to the audio system base 116. Upon receipt of the captured audio signals, the base 116 may perform certain audio signal processing functions and then immediately transmit the processed audio signals to the central server 104 via the communications medium 106. The central server 104 further processes the captured audio signals. Processing performed by the central server 104 typically includes mixing or filtered mixing of the various received audio signals. The central server 104 then transmits to each active physical space a meaningful set of audio signals. In turn, each active physical space uses its speakers 110 to aurally transmit the received set of audio signals. The audio signals transmitted to each active physical space are suitable to allow each active physical space to share, in a sense, a single audio space. For example, listeners present in a first active space can be provided an audio space full of aural signals originating from a geographically separate physical space.

FIGS. 2–5 diagram several different electronic audio connection systems of the present invention. The audio connection systems of these Figures each illustrate different aspects of the present invention. Nonetheless, in many ways each system operates like the audio connection system 100 of FIG. 1. For brevity's sake, therefore, the following descriptions focus on the differences between the various example systems rather than describing similar features repetitively.

Figure 2:
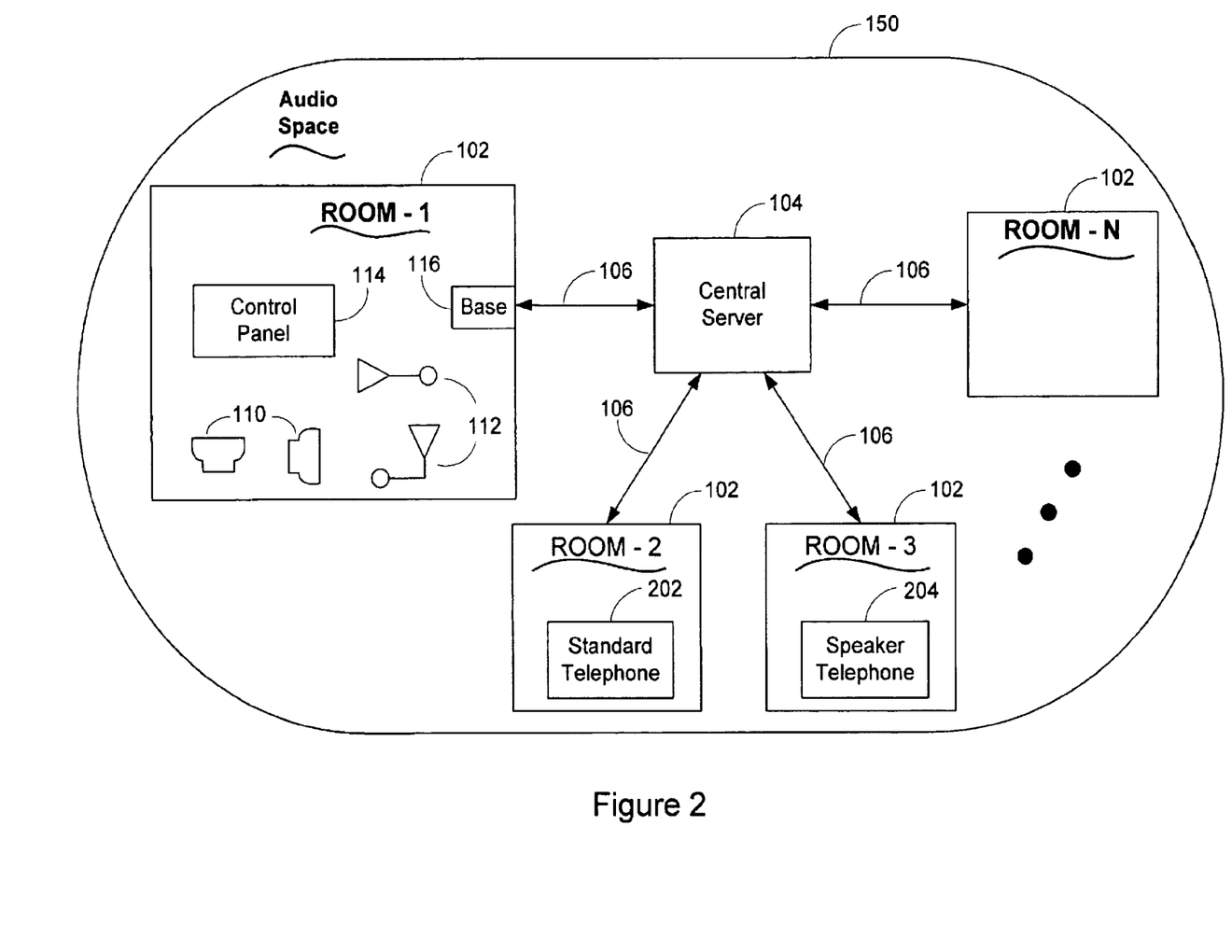
FIG. 2 diagrams an electronic audio connection system incorporating standard telephone technology into the shared audio space of the present invention.

FIG. 2 diagrams a second electronic audio connection system 150 in accordance with another embodiment of the present invention. Like system 100, the electronic audio connection system 150 couples multiple physical spaces 102 to a central server 104 via communications medium 106. However, the electronic audio connection system 150 also incorporates a standard telephone 202 and a speaker telephone 204 into its operation by placing them in ROOM-2 and ROOM-3, respectively. This simply means that the audio information made available by these devices can be included into the shared audio space generated by the central server 104. Likewise, some form of the shared audio space can be provided to spaces ROOM-2 and ROOM-3 via the standard telephone 202 and the speaker telephone 204.

Incorporation of standard telephone devices into the audio connection system 150 indicates not only the backwards compatible nature of the present invention, but also its inherent flexibility. In particular, since signal processing is an ongoing occurrence, any type of information can be added to the shared audio space. A certain user may desire to create aural signals without directly generating such signals. For example, a mute person may use a keyboard or other input device to translate input data into aural signals. These aural signals could be mixed into the shared audio space as the mute person's contribution. Along different lines, the shared audio space can be augmented by a virtual audio space. For example, the users may decide to mix into their shared audio space the sounds of a rain forest or a thronging crowd, depending upon the mood.

Figure 3:
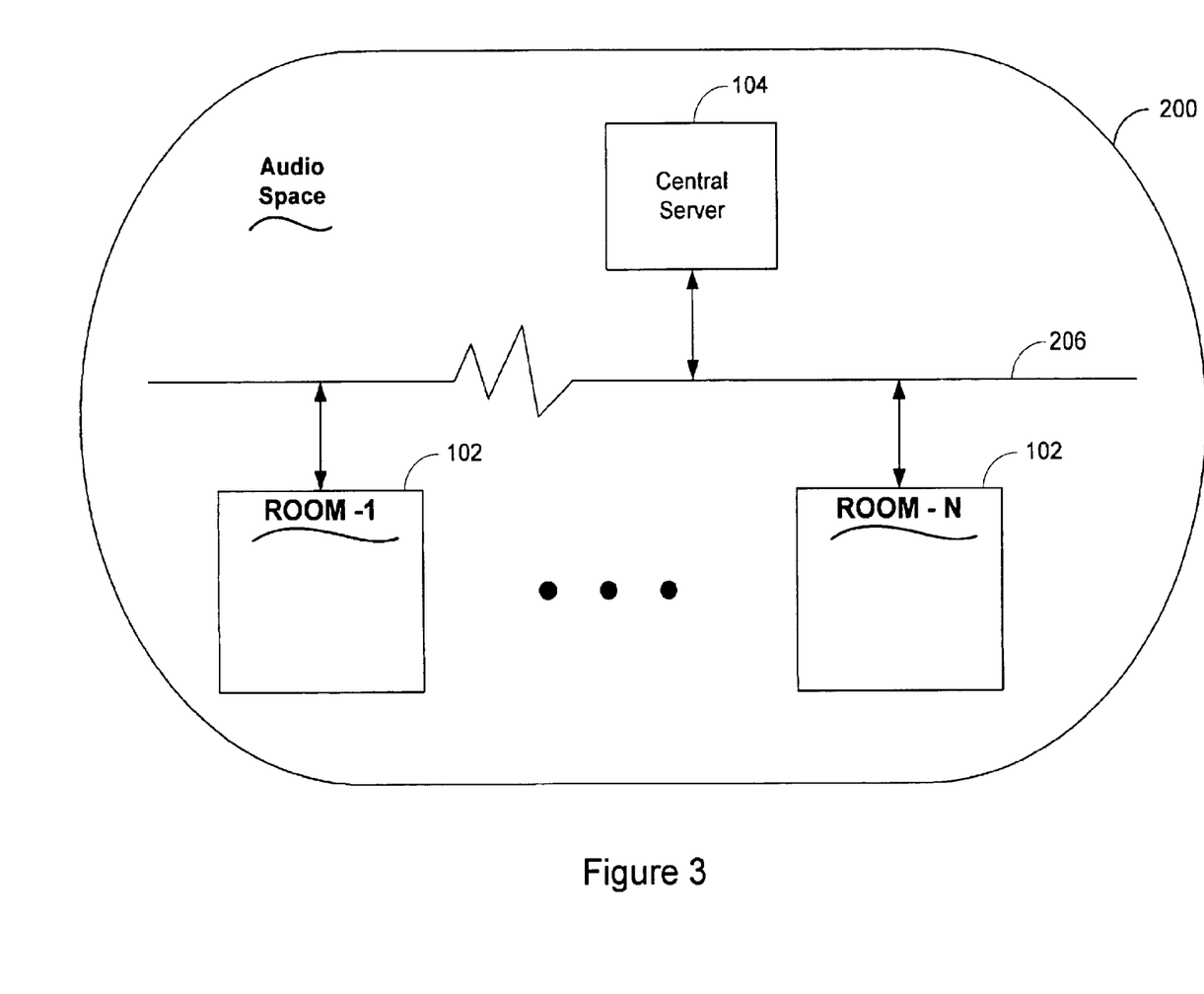
FIG. 3 diagrams an electronic audio connection system that establishes bi-directional communication between physical spaces and the central server over a single bus-like communications medium.

FIG. 3 diagrams yet another electronic audio connection system 200 in accordance with the present invention. In the electronic audio connection system 100 of FIG. 1, the data communications medium 106 was made up of several distinct bi-directional couplings between the physical spaces 102 and the central server 104. Here with the electronic audio connection system 200 of FIG. 3, a bus-like data communications medium 206 is shared by each of the devices. The bus-like data communications medium 206 can be implemented over the Internet or other suitable network.

Figure 4:
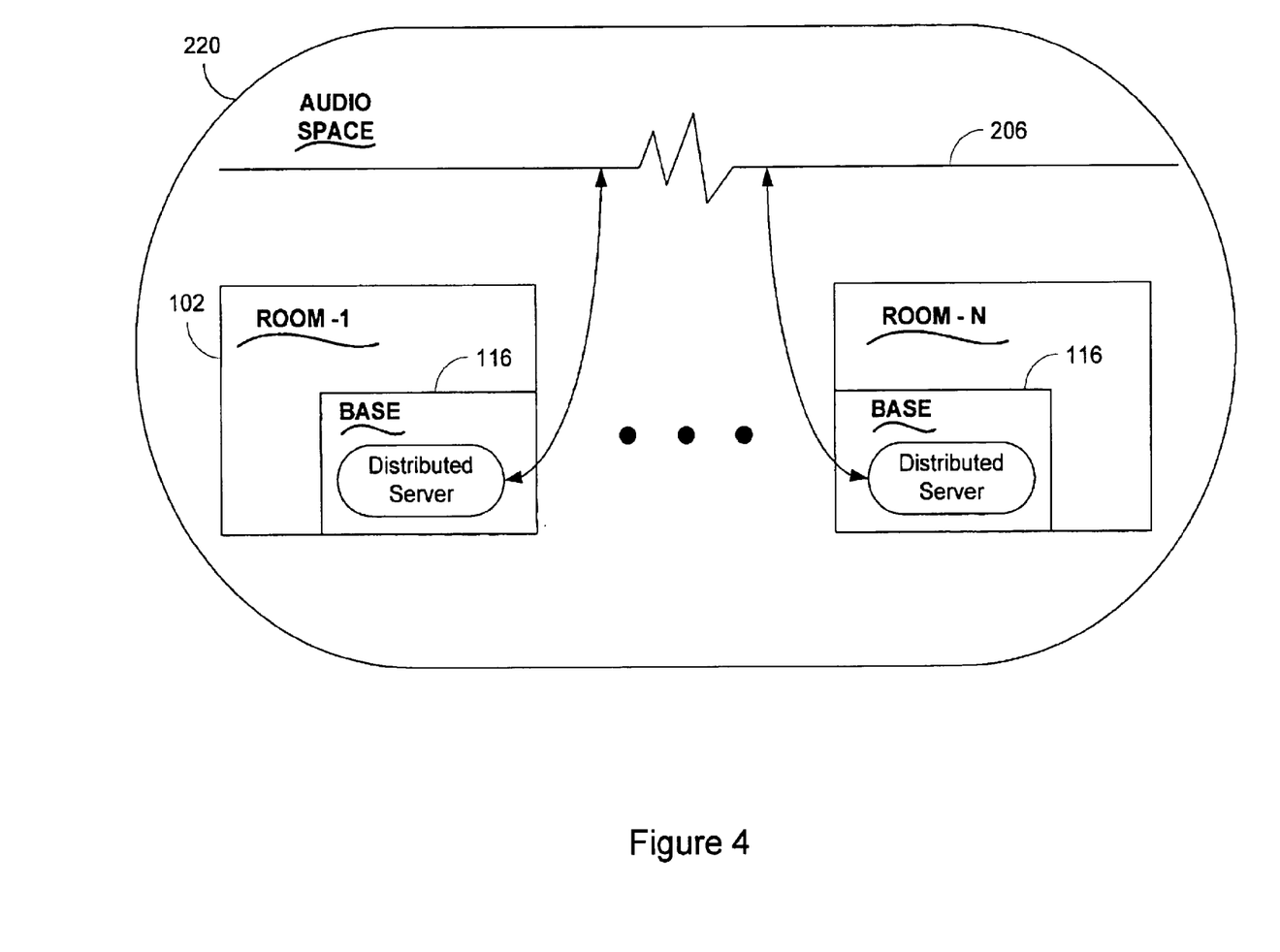
FIG. 4 diagrams an electronic audio connection system having a distributed virtual server in accordance with another embodiment of the present invention.

FIG. 4 diagrams still another electronic audio connection system 220 in accordance with the present invention. Within the electronic audio connection system 200, the signal processing functions are distributed across the bases of the different rooms, creating a distributed or virtual server. Thus, unlike the earlier described electronic audio connection systems, the electronic audio connection system 220 does not have a central server 104. This is an advantage because it requires one less computer system and distributes processing requirements across the entire system.

Figure 5:
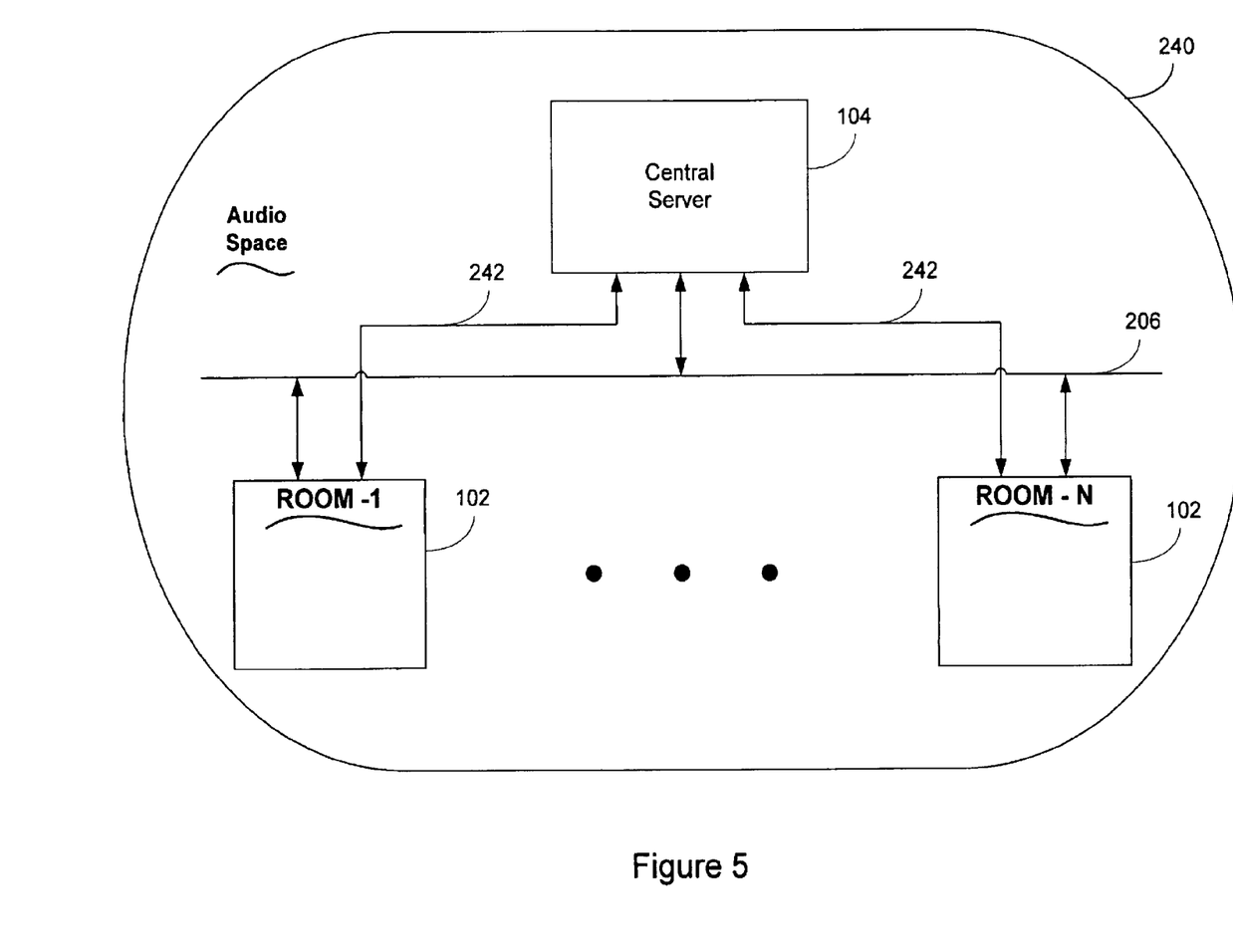
FIG. 5 diagrams an electronic audio connection system having multiple data communications mediums coupling the physical spaces and the central server.

FIG. 5 diagrams yet another electronic audio connection system 240 in accordance with another embodiment of the present invention. The electronic audio connection system 240 includes additional transmission medium 242 that serves to couple each room with a central server 104. For example, each room 102 may only be on-line when actively sharing an audio space and thus when not actively sharing, a room 102 may be out of touch with other users' requests and communications. However, transmission medium 242, which may be a paging system or such, may be used by the central server to activate or communicate with the desired room 102.

Figure 6:
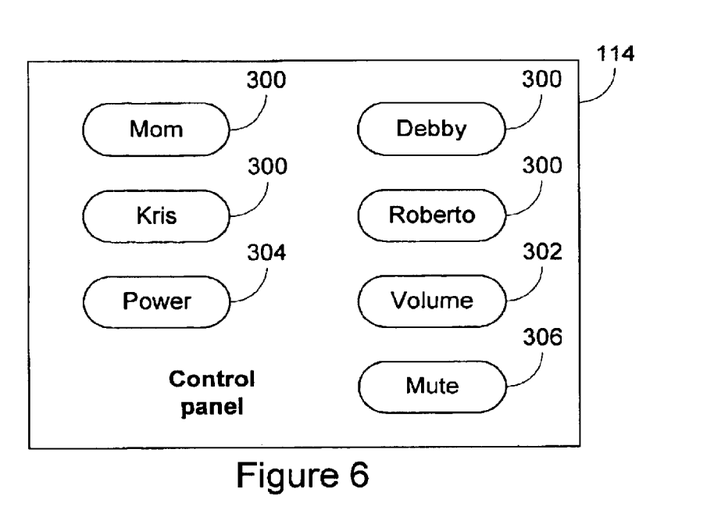
FIG. 6 is an illustration of a control panel in accordance with one embodiment of the present invention.

FIG. 6 illustrates a control panel 114 in accordance with yet another embodiment of the present invention. For the purposes of the present discussion, assume the control panel 114 is found in a physical space ROOM-1. The control panel 114 includes several speed-link buttons 300, a volume control 302, a power control 304, and a mute button 306. Operations of the volume control 302, power control 304, and mute 306 buttons should be self-explanatory.

The speed-link buttons 300 of FIG. 6 are operable to request and accept connections to separate physical spaces 102. For example, a user selecting the speed-link button 300 labeled "MOM" may initiate a negotiation period wherein the separate physical space 102 associated with "MOM" is queried as to whether sharing of an audio space is acceptable. When the separate physical space 102 acknowledges and accepts sharing, the central server 104 creates the desired audio space. On the flip side, the speed-link button 300 labeled "MOM" includes a feedback mechanism that indicates to a listener in ROOM-1 whether sharing of an audio space associated with "MOM" is requested or even presently active. For example, a blinking "MOM" light might indicate that "MOM" wishes to establish a shared audio space with ROOM-1. Selecting the speed-link button 300 with the label "MOM" may establish such a shared audio space. Then the "MOM" light may glow continuously indicating an active shared audio space.

It will be appreciated that the electronic audio connection systems of the present invention are particularly well suited to voice controlled operation. The sophistication of such implementations could vary greatly. The voice controlled electronic audio connection system of the present invention could be responsive to specific voice commands, rendering the electronic audio connection system completely hands-free. For example, a user could enunciate a particular person's name, and the electronic audio connection system could respond by initiating negotiation for the sharing of an audio space with that person. Speaker identification processes enable a person to simply state "MOM" and the electronic audio connection system could identify the requester and thus identify and initiate negotiation with "MOM." Power, mute, and volume functions could all be implemented through voice commands, creating an easy-to-use means for communicating with remote parties.

Speaker identification could also allow emphasis or de-emphasis of particular speakers. By way of example, when one party in a household wishes to maintain privacy, that party's voice could be filtered out or at least de-emphasized. Alternatively, a party from one room may only wish to engage in sharing with a particular person in a particular room. Speaker identification would enable such a negotiation to take place.

Beyond detecting the speaker's identity, aural signal processing functions can be implemented to ascertain affect of sensed speech. That is, the emotive state of the speaker as represented by his or her speech can be determined and utilized for filtering purposes. For example, a devoted son may program the electronic audio connection system such that a distressed communication from his mother would immediately open the connection, skipping the negotiation process and emphasizing his mother's words. Alternatively, stressful but private situations (e.g., a couple fighting) could be sensed and the private dialogue filtered out. For more information on recognition systems for affective vocalizations, please see Slaney and McRoberts' article entitled "BABY EARS: A RECOGNITION SYSTEM FOR AFFECTIVE VOCALIZATION" published in the *Proceedings of the* 1998 *International Conference on Acoustics, Speech, and Signal Processing (ICASSP)*, Seattle, Wash., May 12–15, 1998.

Figure 7:
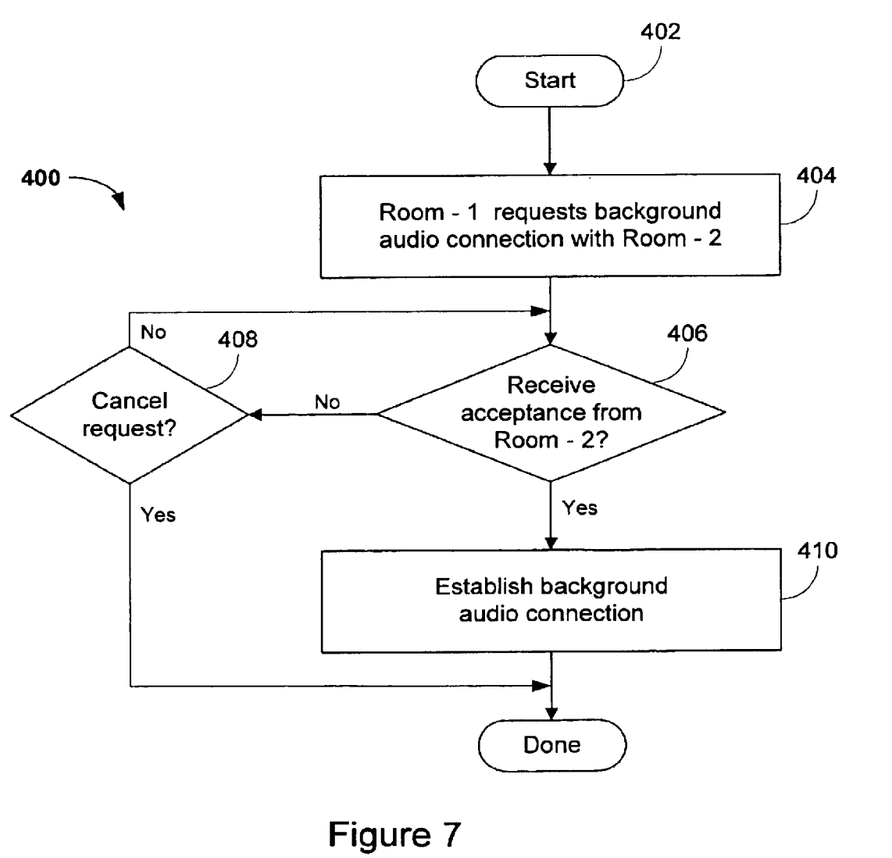
FIG. 7 is a flow chart of a method for initiating the negotiation for the sharing of an audio space according to one aspect of the present invention.

FIG. 7 is a flow chart illustrating a method 400 for negotiating within an electronic audio connection system the formation of a shared audio space. The method 400 would be suitable for use with the electronic audio connection systems 100 and 200 of FIGS. 1 and 2, respectively. Similarly, the control panel 114 of FIG. 6 and the above described voice control system would be suitable for operation with the method 400 of FIG. 7.

The method 400 begins in a start step 402. The start step 402 may include any necessary initiation processes required to accomplish the formation of a shared audio space. For example, the calibration method 700 of FIG. 9 described below may be performed as part of the start step 402. However, in preferred embodiments calibration is performed only as necessary, not during each startup period. Once properly initiated in the start step 402, control of the method passes to a step 404. The step 404 corresponds to ROOM-1 initiating negotiation by requesting that an electronic audio connection be established with a ROOM-2. The negotiation initiation step 404 may arise in a variety of ways. For instance, a listener in ROOM-1 may select a speed-link button on a control panel 114 found in ROOM-1. Alternatively, the control panel 114 or the base 116 may be programmed to initiate negotiation based upon some particular event. For instance, a listener may program the control panel to negotiate a connection with ROOM-2 every day at 12:00 PM. In any event, once negotiation has been initiated in the step 404, control of the method 400 passes to a determination step 406. Step 406 determines whether ROOM-2 has indicated whether it accepts the desired electronic audio connection shared audio space. If ROOM-2 does not indicate that it accepts sharing of an audio space, in a step 408 the method 400 determines whether the request is cancelled. Note that in preferred embodiments, both ROOM-1 and ROOM-2 can cancel the request. When the step 406 determines that ROOM-2 accepts sharing of a single audio space, a step 410 establishes the electronic audio connection.

Figure 8:
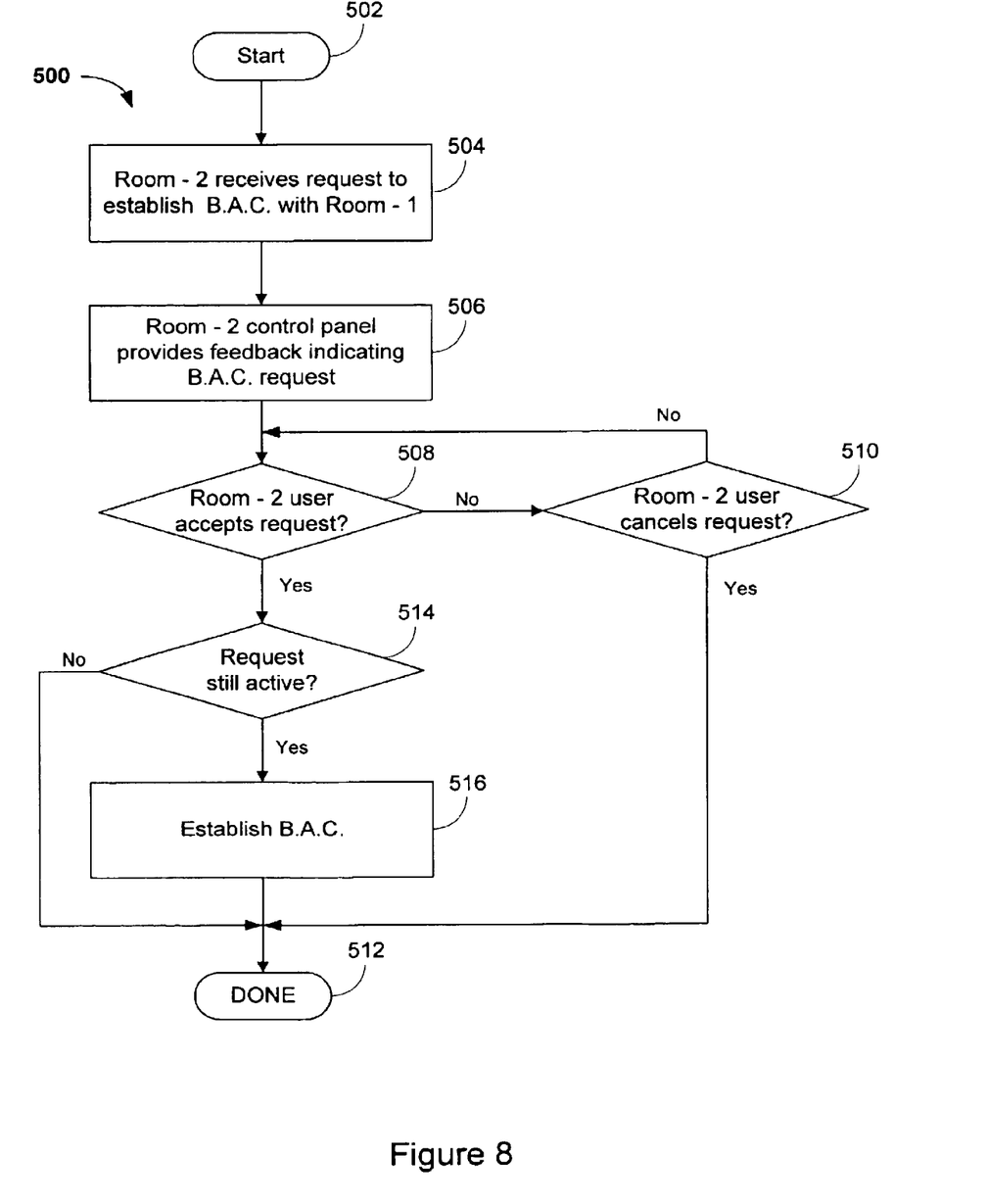
FIG. 8 is a flow chart of a method for negotiating the sharing of an audio space according to another aspect of the present invention.

FIG. 8 is a flow chart illustrating a method 500 for responding to a negotiation initiation such as method 400 of FIG. 7. As with the method 400, the method 500 would be suitable for use with the electronic audio connection systems 100 and 200 of FIGS. 1 and 2, respectively. Similarly, the control panel 114 of FIG. 6 and the above described voice control system would be suitable for operation with the method 500 of FIG. 8.

The method 500 begins in a start step 502. The start step 502 may include any necessary initiation processes required to accomplish the formation of a shared audio space. For example, the calibration method 600 of FIG. 9 described below may be performed as part of the start step 502. Once properly initiated in the start step 502, control of the method passes to a step 504 wherein ROOM-2 receives a request to establish an electronic audio connection with ROOM-1. In response, in a step 506 the ROOM-2 control panel 114 provides feedback indicating the existence of the request initiated by ROOM-2. As mentioned above, this may include a flashing light, an audible sound, or some other appropriate indication.

In a next step 508, it is determined whether ROOM-2 has accepted the ROOM-1 request. If not, in a step 510 it is determined whether ROOM-2 has cancelled the ROOM-1 request. As mentioned above, in certain embodiments both ROOM-1 and ROOM-2 may cancel the request. If the request for a shared audio space is canceled, then the method 500 is completed in a final step 512. The final step 512 may involve shutdown procedures such as keeping statistical track of communications links requested and not established.

If in the step 508 it is determined that ROOM-2 accepts the requested shared audio space, in a step 514 it is determined whether the request is still active (for example, ROOM-1 may have cancelled the request in the intervening time period). When the request is not active, control is passed to the final step 512. However, when the request is active and ROOM-2 accepts, a step 516 establishes the electronic audio connection thereby enabling sharing of a single audio space.

During the course of implementing the electronic audio connection systems of the present invention, the inventors determined several challenges arising from the inherent nature of these systems. Namely, issues such as latency, unwanted echo, unwanted reverberation, and unique requirements for audio filtration naturally arose. Echo and reverb cancellation can be accomplished through standard techniques known to those skilled in the art. The other two issues raised more irksome dilemmas.

Latency (i.e., the time required for the desired audio signals to be available after processing and transmission delays are factored in) can be minimized by sheer brute force. That is, high-speed data communications mediums, powerful processors, and speed optimized audio signal processing functions all work to decrease the latency period. An alternative approach to the latency problem is to mask the latency, for example, through time-scale modification of the audio signals. Both linear and non-uniform time-scale modification techniques are available. For more background on these different compression techniques, please see Covell et al.'s article entitled "MACH1: NONUNIFORM TIME-SCALE MODIFICATION OF SPEECH" published in the *Proceedings of the IEEE International Conference on Acoustics, Speech and Signal Processing*, May 12–15, 1998, Seattle Wash., which is incorporated herein by reference.

In most situations, the primary purpose of the shared audio space is to share speech and speech-like signals. However, non-speech signals may at times overpower the desired speech signals. A variety of pre-existing techniques for distinguishing speech signals from non-speech signals are available in the field. For example, see Scheirer and Slaney's article entitled "CONSTRUCTION AND EVALUATION OF A ROBUST MULTIFEATURE SPEECH/MUSIC DISCRIMINATOR" published in *Proc. ICASSP-97*, April 21–24, Munich, Germany. See, also, Ngo and Bhadkamkar's article entitled "ADAPTIVE BLIND SEPARATION OF AUDIO SOURCES BY A PHYSICALLY COMPACT DEVICE USING SECOND ORDER STATISTICS." Once a technique for distinguishing speech signals has been selected, the distinguished speech signals may be emphasized to create the desired shared audio space.

Figure 9:
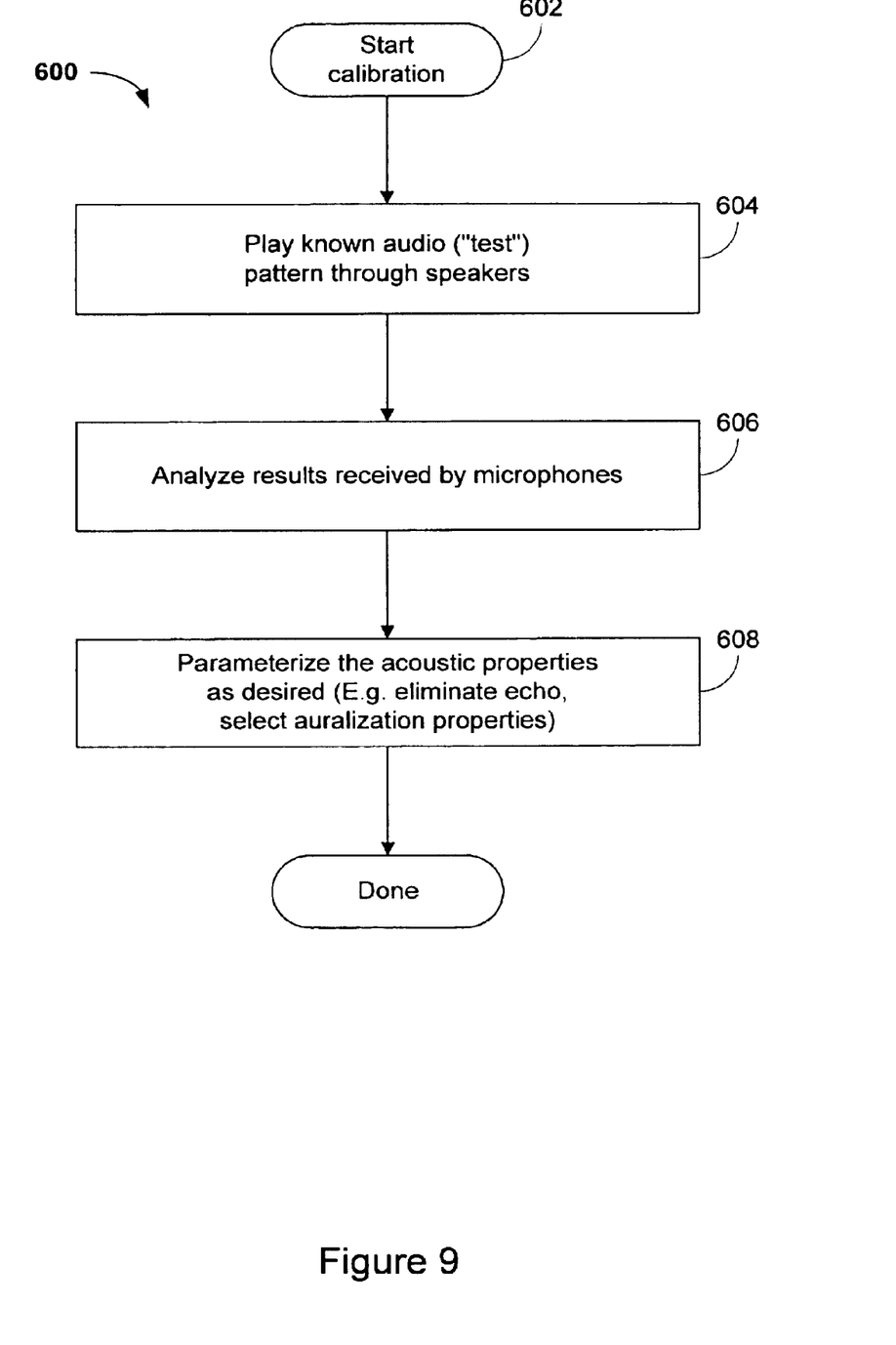
FIG. 9 is a flow chart of a calibration method according to still another aspect of the present invention.

Along these lines, FIG. 9 illustrates a flow chart of a calibration method 600 in accordance with one embodiment of the present invention. In properly configuring the above auralization properties an initial calibration process can be very helpful. The method 600 provides one possible calibration method for setting up the auralization properties for the electronic audio connection systems of the present invention.

In a step 602, the calibration method 600 begins. The method 600 may be initiated each time the electronic audio connection system is powered-up, or may occur when initiated by a user or during a first use of the system. In any event, in a step 604 the method 600 aurally transmits a known ("test") audio pattern through the speakers. Because the test audio pattern is known, the method in a step 606 can analyze the received results, checking for room aural properties such as echo and reverberation, and confirming that the received pattern matches the expected received pattern. Then in a step 608, the method 600 calibrates and sets the auralization properties as desired. This may involve adjusting parameters used in the different audio signal processing functions, but may also include adjusting the positions of the speakers and microphones with the separate physical spaces as required.

While this invention has been described in terms of several preferred embodiments, there are alterations, permutations, and equivalents that fall within the scope of this invention. It should also be noted that there are many alternative ways of implementing both the process and apparatus of the present invention.

The examples presented in the above-description focused on personal room-like physical spaces. However, the present invention contemplates the sharing of an audio space across all kinds of physical spaces. For example, a telecommuter may couple the hallway outside of his or her home office to the hallway outside his or her office at work, creating the impression on both ends of his or her physical presence at the work office. As another example, an outdoor space could be coupled with other indoor spaces.

The above-described embodiments are particularly well-suited for implementation using wireless communications technology. This includes wireless speaker and microphone device technology. However, the speaker and microphone devices may be hard-wired, or may a combination of hard-wire and wireless technology.

As will be appreciated, in communicating the quantity of data quantities contemplated herein it is likely that data compression will be involved in many embodiments. Standard digital audio data compression techniques are well familiar to those skilled in the art and well suited for the present invention. Likewise, standard auto gain control (AGC) or volume control techniques are helpful in creating a useful shared audio space. Signal processing mechanisms may also be used to localize the user as he or she moves about the physical space. This localization information is useful in further signal processing for both the input and output devices (i.e., microphones and speakers).

The present invention also provides a mechanism for accomplishing "one-touch" conferencing between multiple parties. The stereo, immersive nature of the present invention allows such multi-party conferencing to feel as if the parties were positioned around a table, instead of having all the voices in a teleconference come at the listener from a single telephone speaker sitting on a table.

It is therefore intended that the scope of the invention be interpreted as including all such alterations, permutations, and equivalents.

What is claimed is:

1. An electronic audio connection system providing a shared audio space to a plurality of separate physical spaces, the electronic audio connection system comprising:
   a server operable to implement audio signal processing functions;
   a first physical space including a first plurality of speakers, a first plurality of microphones, and a first base, the first base capable of bi-directional communication with the server, the first plurality of microphones operable to transmit a first set of captured audio signals to the first base, the first base operable to process the first set of captured audio signals and transmit the first set of captured audio signals to the server, the first base further operable to transmit a first set of playable audio signals received from the server to the first plurality of speakers, the first plurality of speakers operable to transmit the first set of playable audio signals, whereby the transmit first set of playable audio signals together with any other aural signals present in the first physical space form a first audio space perceptible to a fist listener in the first physical space;
   a second physical space including a second plurality of speakers, a second plurality of microphones, and a second base, the second base capable of bi-directional communications with the server, the second plurality of microphones operable to transmit a second set of captured audio signals to the second base, the second base operable to process the second set of captured audio signals and transmit the second set of captured audio signals to the server, the second base further operable to transmit a second set of playable audio signals received from the server to the second plurality of speakers, the second plurality of speakers operable to transmit the second set of playable audio signals, whereby the transmit second set of playable audio signals together with any other aural signals present in the second physical space form a second audio space perceptible to a second listener in the second physical space;
   wherein the first set of captured audio signals may be further processed at the server and transmitted to the second base as the second set of playable audio signals such that when the second plurality of speakers transmits the second set of playable audio signals the second audio space is directly related to the first audio space;
   wherein the first physical space further includes a first control panel operable to control the first audio space through control of the first base, the first plurality of speakers, and the first plurality of microphones; and
   wherein the first control panel includes a second physical space selector switch, the second physical space selector switch operable to couple and de-couple the first and second audio spaces.

2. An electronic audio connection system as recited in claim 1 wherein the second physical space selector switch includes a feedback mechanism operable to provide an indication that the second physical space is available for establishment of a correlation between the first and second audio spaces.

3. An electronic audio connection system as recited in claim 2 wherein the feedback mechanism is a light emitting device.

4. An electronic audio connection system as recited in claim 2 wherein the feedback mechanism is a sound emitting device.

5. An electronic audio connection system as recited in claim 1 wherein the second physical space selector switch is operable to request that the second physical space be made available for establishment of a correlation between the first and second audio spaces.

6. An electronic audio connection system providing a shared audio space to a plurality of separate physical spaces, the electronic audio connection system comprising:
   a server operable to implement audio signal processing functions;
   a first physical space including a first plurality of speakers, a first plurality of microphones, and a first base, the first base capable of bi-directional communication with the server, the first plurality of microphones operable to transmit a first set of captured audio signals to the first base, the first base operable to process the first set of captured audio signals and transmit the first set of captured audio signals to the server, the first base further operable to transmit a first set of playable audio signals received from the server to the first plurality of speakers, the first plurality of speakers operable to transmit the first set of playable audio signals, whereby the transmit first set of playable audio signals together with any other aural signals present in the first physical space form a first audio space perceptible to a fist listener in the first physical space;
   a second physical space including a second plurality of speakers, a second plurality of microphones, and a second base, the second base capable of bi-directional communications with the server, the second plurality of microphones operable to transmit a second set of captured audio signals to the second base, the second base operable to process the second set of captured audio signals and transmit the second set of captured audio signals to the server, the second base further operable to transmit a second set of playable audio signals received from the server to the second plurality of speakers, the second plurality of speakers operable to transmit the second set of playable audio signals, whereby the transmit second set of playable audio signals together with any other aural signals present in the second physical space form a second audio space perceptible to a second listener in the second physical space;

wherein the first set of captured audio signals may be further processed at the server and transmitted to the second base as the second set of playable audio signals such that when the second plurality of speakers transmits the second set of playable audio signals the second audio space is directly related to the first audio space;

wherein the first physical space further includes a first control panel operable to control the first audio space through control of the first base, the first plurality of speakers, and the first plurality of microphones; and wherein the electronic audio connection system is a voice controlled audio connection system and the control panel includes a voice command device.

7. An electronic audio connection system as recited in claim 6 wherein the voice command device is responsible to the enunciation of a plurality of words, each word being associated with a particular command function.

8. An electronic audio connection system as recited in claim 7 wherein a particular word is associated with a particular physical space and the voice command device is responsive to the enunciation of the particular word in order to initiate negotiation for the sharing of an audio space with the particular physical space.

9. An electronic audio connection system as recited in claim 7 wherein a particular word is associated with a particular person and the voice command device is responsive to the enunciation of the particular word in order to initiate negotiation for the sharing of an audio space with a particular physical space associated with the particular person.

10. An electronic audio connection system as recited in claim 7 wherein a particular word is associated with a particular volume control function and the voice command device is responsible to the enunciation of the particular word in order to control volume.

11. An electronic audio connection system as recited in claim 9 wherein the particular volume control command is a mute command.

12. An electronic audio connection system as recited in claim 7 wherein a particular word is associated with power on control of the electronic audio connection system.

13. An electronic audio connection system as recited in claim 7 wherein a particular word is associated with power off control of the electronic audio connection system.

14. An electronic audio connection system arranged to allow a plurality of separate physical spaces to share a single audio space, the electronic audio connection system comprising:

a central server operable to implement audio signal processing functions;

a data communications medium;

a first physical space including a first plurality of speakers, a first plurality of microphones, and a first base, the first base bi-directionally coupling the first room-like space to the central server through the data communications medium, the first plurality of microphones operable to transmit a first set of captured audio signals to the first base, the first base operable to process the first set of captured audio signals and transmit the first set of captured audio signals to the central server, the first base further operable to transmit a first set of playable audio signals received form the central server to the first plurality of speakers, the first plurality of speakers operable to transmit the first set of playable audio signals, whereby the transmit first set of playable audio signals together with any other aural signals present in the first physical space form a first audio space perceptible to a first listener in the first physical space;

a second physical space including a second plurality of speakers, a second plurality of microphones, and a second base, the second base bi-directionally coupling the second room-like space to the central server through the data communications medium, the second plurality of microphones operable to transmit a second set of captured audio signals to the second base, the second base operable to process the second set of captured audio signals and transmit the second set of captured audio signals to the central server, the second base further operable to transmit a second set of playable audio signals received from the central server to the second plurality of speakers, the second plurality of speakers operable to transmit the second set of playable audio signals, whereby the transmit second set of playable audio signals together with any other aural signals present in the second physical space form a second audio space perceptible to a second listener in the second physical space;

wherein the first set of captured audio signals may be further processed at the central server and transmitted to the second base as the second set of playable audio signals such that when the second plurality of speakers transmits the second set of playable audio signals the second audio space is directly correlated to the first audio space;

wherein the first physical space further includes a first control panel, the first control panel operable to control the first audio space through control of the first base, the first plurality of speakers, and the first plurality of microphones; and wherein the first control panel includes a second physical space selector switch, the second physical space selector switch operable to couple and de-couple the first and second audio spaces.

15. An electronic audio connection system as recited in claim 14 wherein the second physical space selector switch includes a feedback mechanism operable to provide an indication that he second physical space is available for establishment of a correlation between the first and second audio spaces.

16. An electronic audio connection system as recited in claim 15 wherein the feedback mechanism is a light emitting device.

17. An electronic audio connection system as recited in claim 15 wherein the feedback mechanism is a sound emitting device.

18. An electronic audio connection system as recited in claim 17 wherein the second physical space selector switch is operable to request that the second physical space be made available for establishment of a correlation between the first and second audio spaces.

* * * * *